(12) United States Patent
Rausch

(10) Patent No.: US 6,914,572 B1
(45) Date of Patent: Jul. 5, 2005

(54) ANTENNA CONTROL SYSTEM IN A WIRELESS COMMUNICATION SYSTEM

(75) Inventor: Walter F. Rausch, Shawnee, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 56 days.

(21) Appl. No.: 10/623,982

(22) Filed: Jul. 21, 2003

Related U.S. Application Data

(63) Continuation of application No. 09/981,169, filed on Oct. 16, 2002, now Pat. No. 6,624,791.
(60) Provisional application No. 60/271,834, filed on Feb. 27, 2001.

(51) Int. Cl.$^7$ ................................................ H01G 3/02
(52) U.S. Cl. ..................................... 343/766; 343/876
(58) Field of Search ................................ 343/766, 876, 343/758, 882, 883, 725, 728; 455/522, 69, 447; 375/220

(56) References Cited

U.S. PATENT DOCUMENTS

| | | | |
|---|---|---|---|
| 4,749,995 A * | 6/1988 | Hopwood et al. | 342/371 |
| 5,771,015 A | 6/1998 | Kirtman et al. | 342/359 |
| 5,926,501 A | 7/1999 | Souissi et al. | 375/131 |
| 6,035,183 A | 3/2000 | Todd et al. | 455/226.2 |
| 6,212,242 B1 | 4/2001 | Smith et al. | 375/299 |
| 6,239,744 B1 * | 5/2001 | Singer et al. | 343/766 |
| 6,330,433 B1 | 12/2001 | Jager | 455/277.2 |
| 6,392,610 B1 | 5/2002 | Braun et al. | 343/876 |
| 6,456,257 B1 | 9/2002 | Zamat | 343/876 |
| 6,501,372 B2 | 12/2002 | Lin | 343/712 |
| 6,624,791 B1 | 9/2003 | Rausch | 343/766 |
| 6,667,714 B1 * | 12/2003 | Solondz | 455/562.1 |
| 6,697,642 B1 * | 2/2004 | Thomas | 455/522 |

* cited by examiner

Primary Examiner—Don Wong
Assistant Examiner—Ephrem Alemu

(57) ABSTRACT

A present embodiment of the invention solves the problem by providing an antenna control system in a wireless communication system. A communication interface transfers a control signal to an antenna controller. The antenna controller processes the control signal. The antenna controller then substitutes an antenna with another antenna based on the control signal. Advantages of the embodiments include providing a reliable wireless communication system that decreases the number of lost calls by increasing the availability of antennas. Other advantages include providing flexible antenna coverage to an area by remotely controlling the antenna through a public communication network by means of a modem.

18 Claims, 6 Drawing Sheets

ANTENNA CONTROL SYSTEM IN A WIRELESS COMMUNICATION SYSTEM

RELATED APPLICATIONS

This application is a continuation of U.S. patent application Ser. No. 09/981,169, filed on Oct. 16, 2002, now U.S. Pat. No. 6,624,791 entitled AN ANTENNA CONTROL SYSTEM IN A WIRELESS COMMUNICATION SYSTEM, which is hereby incorporated by reference into this application, and which claims the benefit of U.S. Provisional Patent Application 60/271,834, entitled BROADBAND WIRELESS COMMUNICATION SYSTEM, filed on Feb. 27, 2001, and which is hereby incorporated by reference into this application.

FEDERALLY SPONSORED RESEARCH OR DEVELOPMENT

Not applicable

MICROFICHE APPENDIX

Not applicable

BACKGROUND OF THE INVENTION

1. Field of the Invention

This invention relates to the field of telecommunications, and in particular to antenna control systems within wireless communication systems.

2. Description of the Prior Art

People and businesses demand larger bandwidths from their wireless communication providers. People and businesses also rely on dependability from their wireless communication providers. Consequently, the wireless communication providers are looking for ways to increase the dependability of their broadband wireless systems. A broadband system is generally referred to as a system that delivers 64 kilobits per second or above. Broadband systems can communicate over downstream channels and upstream channels. A customer receives data from another device or system over a downstream channel. The customer transmits data to another device or system over an upstream channel.

Antennas are used to transmit and receive data in a wireless communication system. The antennas are mounted on antenna structures and remotely located outdoors. An antenna structure typically has several antennas mounted to the antenna structure to support varying angles of reception and transmission coverage. Many antenna structures used in wireless communication systems, such as cellular telephony systems, support 360 degrees of reception and transmission coverage. Coverage of 360 degrees is achieved using multiple antennas with each antenna having a coverage of less than 360 degrees. For example, an antenna structure may comprise six antennas to support coverage of 360 degrees. Therefore, each antenna must cover 60 degrees to achieve a sum total coverage of 360 degrees.

An antenna feed is coupled to each antenna of the antenna structure. The antenna feed carries information about the transmitted and received data to a processing center. The information also includes a gain of the antenna The information regarding transmitted data, received data, and the gain of the antenna can yield clues as to an operational effectiveness of the antenna. When the operational effectiveness of an antenna is determined to be degraded or non-operational, the antenna is replaced. Physical replacement or repair of the antenna takes time that creates an outage for the wireless communication provider.

In many instances, antenna structures for the wireless communication systems are placed in regions of high consumer density such as cities. Cities offer large consumer populations but also offer many obstacles to transmitting and receiving data. The obstacles reside in the forms of trees and buildings, among other things. Furthermore, new obstacles can appear where no obstacle existed before. Thus, antenna structures are not always located where coverage is optimal. Moreover, since the antenna structures are normally located outdoors, the antenna structures are subjected to extreme weather conditions. Extreme weather conditions can either reduce or ultimately eliminate an antenna's operational capability. As a result, the wireless communication providers suffer decreased capabilities or even outages.

Unfortunately, communication outages of any duration immediately result in lost revenue to the service provider. Remotely located antennas compound the duration of an outage. Customers are insensitive to the conditions placed on a service provider. If a customer experiences "lost calls" as a result of service outages, the customer may become dissatisfied with the service provider. A dissatisfied customer is likely to switch to a competing service provider. A switch to a competing service provider obviously results in longer term lost revenue.

One solution is to backup each existing antenna with another fixed position antenna. However, the solution increases the number of antennas and becomes cost prohibitive. Furthermore, the solution does not comprise coverage flexibility, which may be all that is needed to support a degraded operational capability of an antenna. Another solution to the problem includes decreasing the sector coverage of each antenna thereby minimizing the loss, but this solution also serves to increase the number antennas. Both of the current solutions serve to support ineffective antennas, but both solutions also increase costs by increasing the number of antennas. Moreover, fixed antenna solutions are not flexible.

SUMMARY OF THE INVENTION

The above identified problems, and others, are solved and a technical advance is made in the field. A present embodiment of the invention solves the problem by providing an antenna control system in a wireless communication system. A communication interface transfers a control signal to an antenna controller. The antenna controller processes the control signal. The antenna controller then substitutes an antenna with another antenna based on the control signal.

In one embodiment of the invention, the wireless communication system is a broadband wireless communication system. In another embodiment, the communication interface is connected to a public communication network and the control signal is a modem command. In yet another embodiment, the antenna controller detects an instruction in the control signal, determines a type of antenna control based on the instruction and provides another control signal to a motor of the antenna controller. Still, in yet another embodiment, the present invention includes detecting a condition that necessitates the substitution of an antenna with another antenna.

Advantages of the embodiments include providing a reliable wireless communication system that decreases the number of lost calls by increasing the availability of antennas. Other advantages include providing flexible antenna coverage to an area by remotely controlling the antenna through a public communication network by means of a modem.

A particular reference number in one figure refers to the same element in all of the other figures.

DETAILED DESCRIPTION OF THE DRAWINGS

Figure 1:
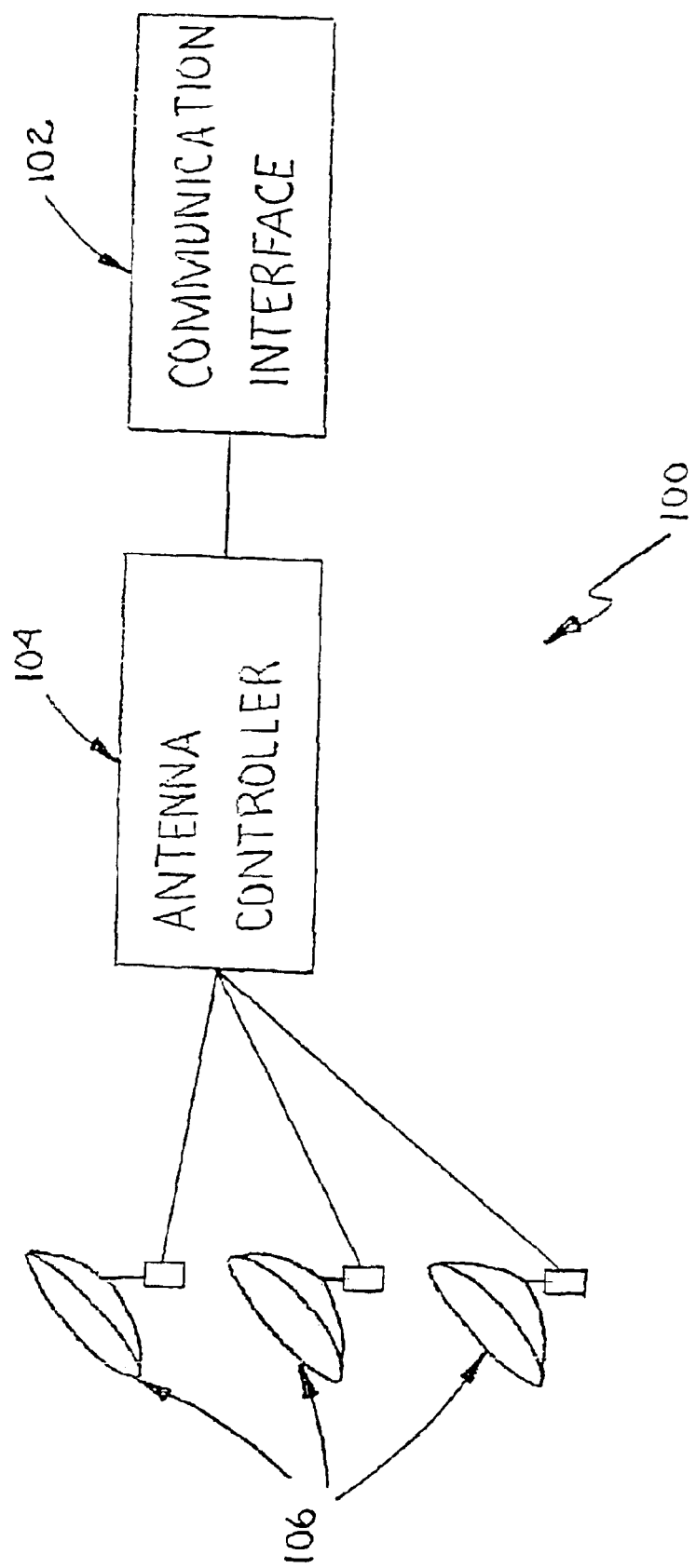
FIG. 1 illustrates a diagram of an antenna control system in an example of the invention.
Figure 2:
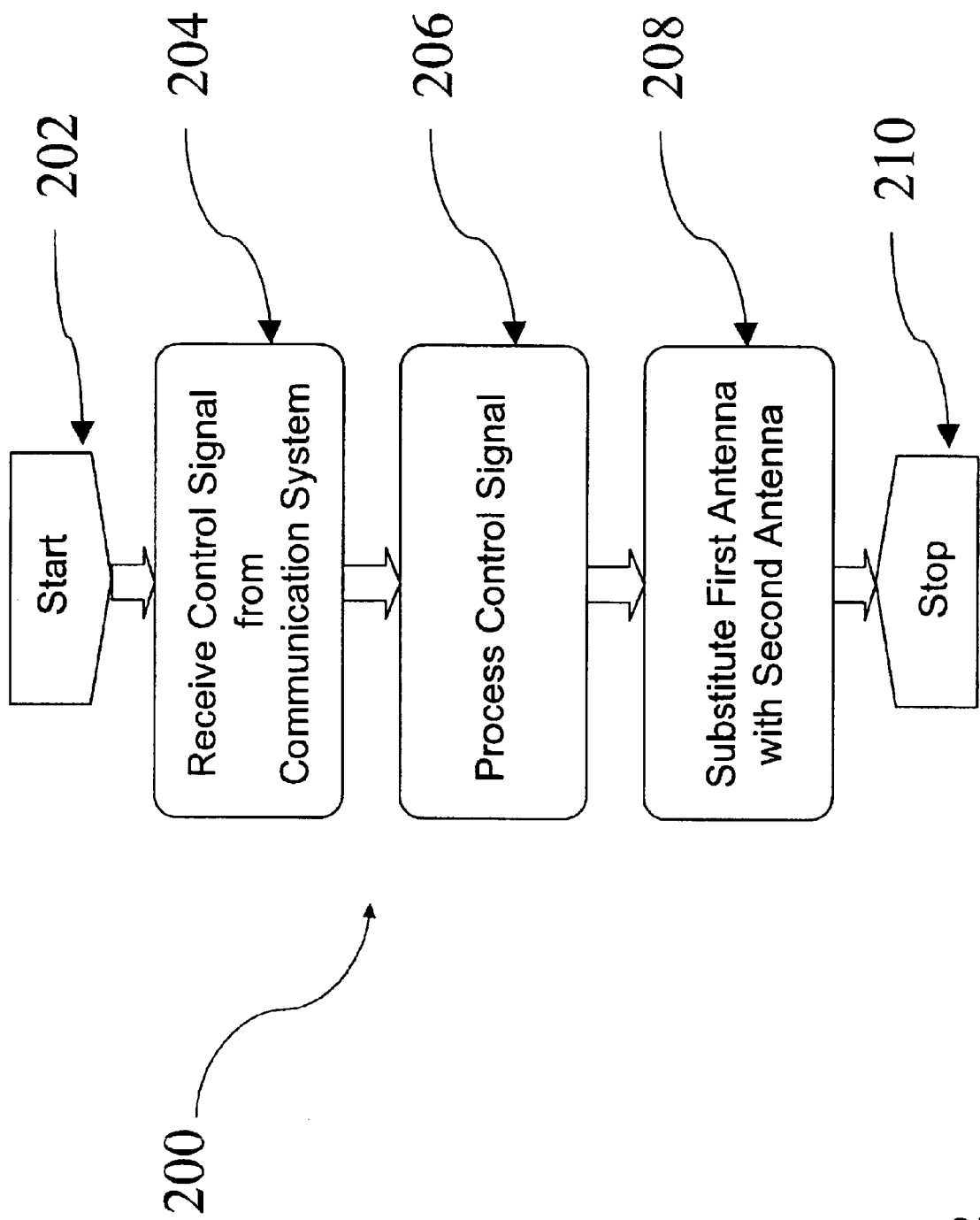
FIG. 2 illustrates a flowchart of the antenna control system in an example of the invention.

Antenna Control System—FIGS. 1 and 2

FIG. 1 illustrates a diagram of antenna control system 100 in an example of the present invention. Antenna control system 100 comprises communication interface 102, antenna controller 104, and a plurality of antennas 106. Communication interface 102 is coupled to antenna controller 104, and antenna controller 104 coupled to the plurality of antennas 106. Antenna control system 100 is any system used in a wireless communication system configured to (1) transfer a first control signal from a communication system interface, (2) process the first control signal in an antenna controller, and (3) substitute a first antenna with a second antenna based on the first control signal.

In antenna control system 100, antenna controller 104 is any device configured to process the first control signal and substitute the first antenna with the second antenna based on the first control signal. In antenna control system 100, communication interface 102 is any interface configured to transfer the first control signal to the antenna controller. Communication interface 102 is configured to transfer a first control signal to antenna controller 104. The first control signal is any signal, message, or instruction that causes the substitution of the first and antenna with the second antenna. Operation of antenna control system 100 is explained below in FIG. 2.

FIG. 2 illustrates a flowchart of antenna control system 100. Operation of antenna control system 100 commences in step 202. Communication interface 102 receives the control signal in step 204, and transfers the control signal to antenna controller 104. Antenna controller 104 processes the control signal in step 206. Antenna controller 104 then substitutes a first antenna of the plurality of antennas with a second antenna in step 208. In one embodiment, the first antenna is a normal operation antenna and the second antenna is a backup antenna. Once the first antenna is substituted, the operation ends in step 210. The above operation may be used in a broadband wireless communication system but is not limited to such a system.

Antenna Control System with Modems—FIGS. 3–6

FIGS. 3–6 disclose one embodiment of the invention, but the invention is not restricted to the configuration provided below. Those skilled in the art will appreciate numerous variations in a wireless communication system configuration and operation that are within the scope of the invention. Those skilled in the art will also appreciate how the principles illustrated in this example can be used in other examples of the invention.

Figure 3:
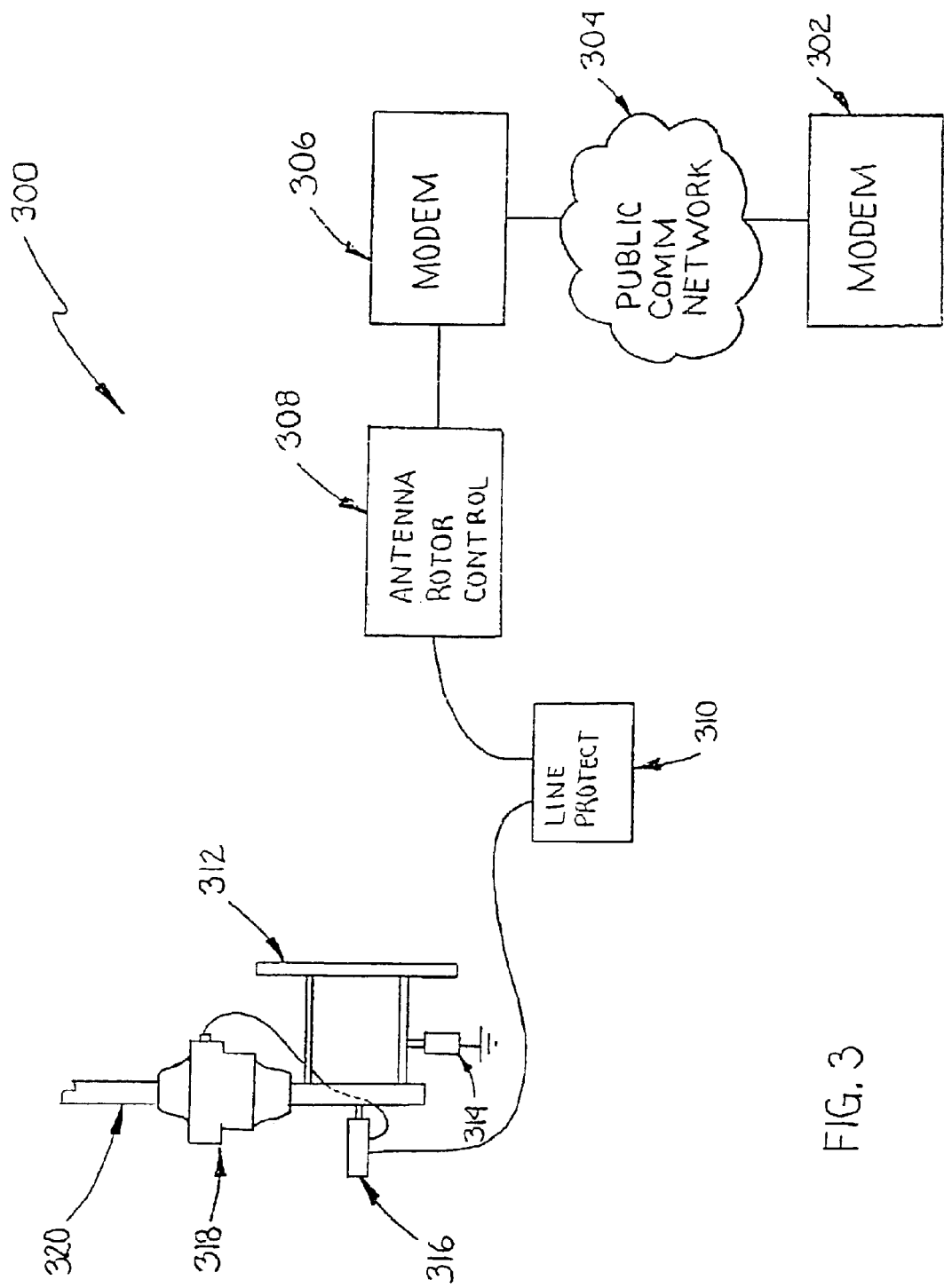
FIG. 3 illustrates a diagram of an antenna control system including an antenna rotor control in an example of the invention.

FIG. 3 illustrates an embodiment of antenna control system 300 including antenna rotor control 308. Antenna control system 300 comprises modem 302, public communication network 304, modem 306, antenna rotor control 308, line protector 310, line protector 316, antenna motor 318, antenna base 320, mounting bracket 312, and lightening suppressor circuit 314. Modem 302 is coupled to public communication network 304. Modem 306 is also coupled to public communication network 304 to form a complete communication path. Modem 306 is coupled to antenna rotor control 308. Antenna rotor control 308 is coupled to line protector 310. Line protector 310 is coupled to line protector 316. Line protector 316 is coupled to antenna motor 318. Antenna base 320 is mechanically attached to antenna motor 318. Antenna motor 318 is attached to mounting bracket 312. Lightening suppressor circuit 314 is coupled antenna motor 318 and coupled to receive a ground reference potential. Operation of antenna control system 300 is described below in FIG. 4.

Figure 4:
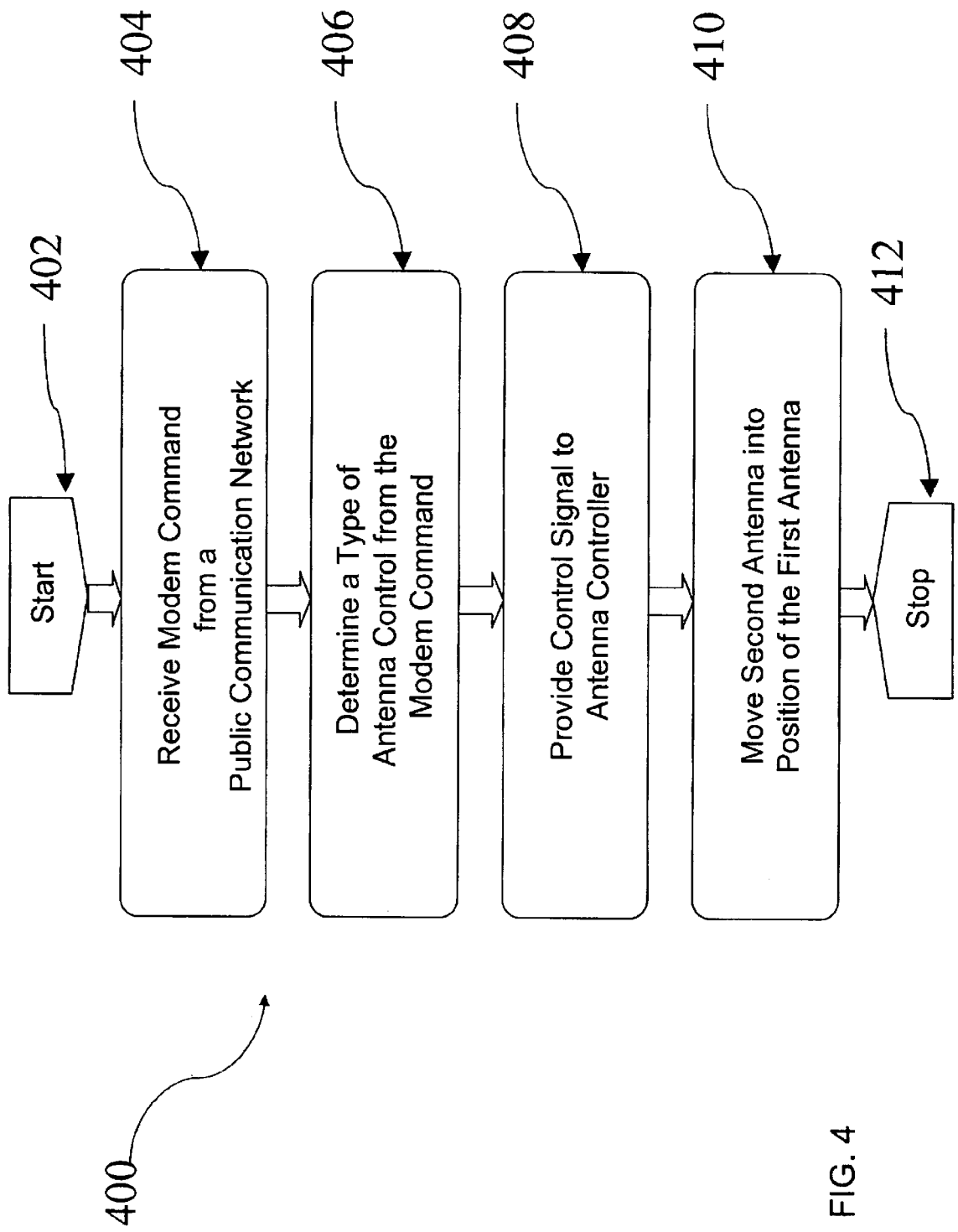
FIG. 4 illustrates a flowchart of the antenna control system including the antenna rotor control in an example of the invention.

FIG. 4 illustrates a flowchart of antenna control system 300 including antenna rotor control 308. Operation of antenna control system 300 commences in 402. Modem 306 receives a modem command from modem 302 through public communication network 304 in step 404. Modem 306 transfers the modem command to antenna rotor control 308. Antenna rotor control 308 comprises a circuit that is configured to process the modem command and determine a type of antenna control from the modem command in step 406. Antenna rotor control 308 then provides an antenna control signal to antenna motor 318 through a line that is protected by line protector 310 and line protector 316 in step 408. Rotating antenna base 320 has the effect of moving a backup antenna into a position that is similar to a position of the normal operation antenna, thereby causing the substitution of the normal operation antenna in step 410. Once the normal operation antenna is substituted, the operation ends in step 412. Again, the above operation may be used in a broadband wireless communication system but is not limited to such a system.

In another embodiment, antenna control system 300 detects a condition that necessitates substituting the normal operation antenna with the backup antenna. Once the condition is detected, a type of antenna control is formatted into a modem command and transmitted to modem 302. Modem 302 transfers the modem command through public Communication network 304 to modem 306 to ultimately control the backup antenna.

In another embodiment, antenna control system 300 suppresses signal amplification from lightening strikes through lightening suppressor circuit 314. Lightening suppressor circuit 314 grounds any unwanted signal amplification within the line.

In another embodiment, modem 306 comprises a Multi-Tech model MT5634ZBA modem. Communication with modem 306 is achieved using modem communication software, such as HyperTerminal found in the Microsoft Windows operating system. In one embodiment, the modem communication software is configured to 9600 bauds per second, eight bits, no parity, and one stop bit. Modem commands are used to communicate to modem 306. The following modem commands are sent in order to program the MultiTech model MT5634ZBA modem for remote service:

AT&F0!
AT#S=REMOTECG!
AT#SREMOTECG!
AT#CBS2!
ATM0L1&D&K\T70!
ATS10=1S89=0S11=150S35=0S30=70!
AT$SB9600!
AT&Z0=-!
AT#CBNO=MDSROTOR!
AT#CBD1!
ATE0Q1&W0!

Remote communication to the MultiTech model MT5634ZBA modem can commence once the MultiTech model MT5634ZBA modem is programmed. The MultiTech model MT5634ZBA modem prompts a user to enter a password upon initiation of communications. After successfully entering the password, the user can control an antenna by issuing antenna commands to the MultiTech model MT5634ZBA modem. Typical antenna commands are as follows:

C—causes the modem to report the current bearing angle for the antenna

Mxxx—causes the antenna to move to the bearing angle of xxx degrees

S—stops movement of the antenna rotor

H—lists various other antenna commands.

In the embodiment comprising the MultiTech model MT5634ZBA modem, Antenna rotator control 308 comprises a Yaesu GS-23 computer interface. Antenna motor 318 comprises a Yaesu G-800SDX rotor. Mounting bracket 312 comprises a Yaesu GC-038 mounting bracket. Line Protector 316 comprises a Polyphaser Model IS-RCT-92. Line Protector 310 comprises a Polyphaser Model IS-RCT.

Figure 5:
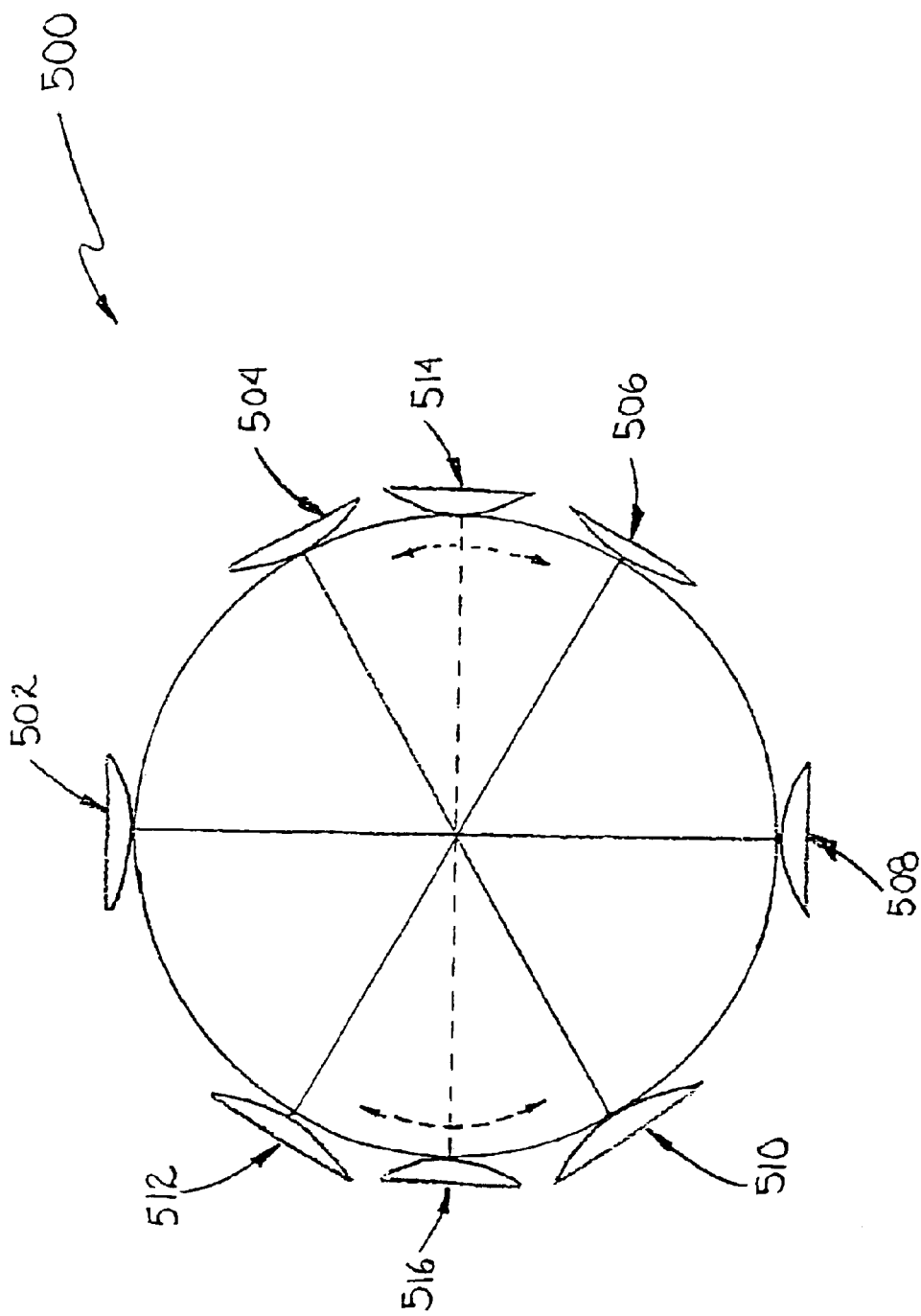
FIG. 5 illustrates a diagram of an antenna structure including individual antennas in an example of the invention.

FIG. 5 illustrates an antenna structure 500 as seen from an overhead view in an example of the invention. Antenna structure 500 comprises antenna 502, antenna 504, antenna 506, antenna 508, antenna 510, antenna 512, antenna 514, and antenna 516. Antenna 514 and antenna 516 represent backup antennas. FIG. 5 is intended to represent one embodiment for sectorization of antenna structure 500 that covers 360 degrees with 6 normal operating antennas, each antenna having a sector coverage of 60 degrees. Backup antenna 514 and backup antenna 516 are shown with a curved dotted arrow to illustrate a radial movement of the antenna within antenna structure 500. The radial movement of backup antenna 514 and backup antenna 516 allows each antenna to move into a position of a normal operation antenna when a normal operation antenna needs replacement. For example, if antenna 510 needed replacement, antenna 516 is rotated approximately 30 degrees to have a new position that is similar to a position of antenna 510. Furthermore, if a normal operation antenna was partially obstructed, a backup antenna could be rotated into a position to compensate for signal loss associated with the normal operation antenna.

Figure 6:
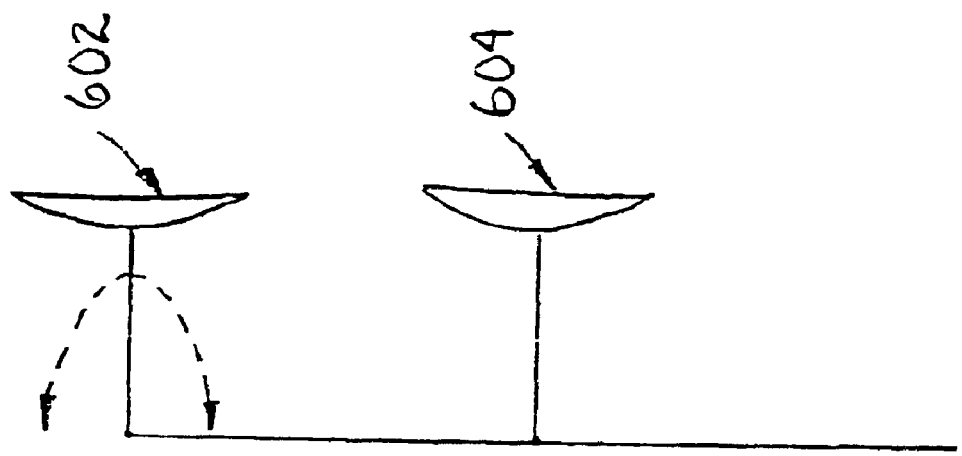
FIG. 6 illustrates an embodiment of the relationship between a backup antenna and a normal operation antenna of the antenna structure in an example of the invention.
Figure 6:
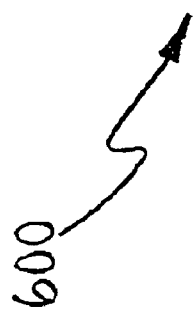

FIG. 6 illustrates a side view of an antenna structure embodiment in an example of the invention. Antenna structure 600 has two antennas in this embodiment, antenna 602 and antenna 604. Antenna 604 can be viewed as a normal operation antenna while antenna 602 can be viewed as a backup antenna. A curved dotted arrow line is drawn around antenna 602 to illustrate a radial motion of antenna 602. This embodiment shows the backup antenna's ability to move in a radial manner into a position that is similar to that of the normal operation antenna when the normal operation antenna needs replacement. The backup antenna is also used as an additional antenna for providing flexible antenna coverage.

Those skilled in the art will appreciate variations of the above-described embodiments that fall within the scope of the invention. As a result, the invention is not limited to the specific examples and illustrations discussed above, but only by the following claim and their equivalents.

I claim:

1. An antenna system comprising:
   a first antenna;
   a first communication interface configured to receive an antenna system command from a communication network;
   a controller operatively coupled to the first communication interface and configured to process the antenna system command to generate a motor control signal; and
   a motor operatively coupled to the controller and to the first antenna and configured to process the motor control signal to move the first antenna from a first position to a second position allowing the first antenna to operate as a back-up to a second antenna.

2. The antenna system of claim 1 wherein the second position allows the first antenna to compensate for signal loss.

3. The antenna system of claim 1 wherein the first communication interface is configured to successfully collect a password before the first antenna is allowed to move in response to the antenna system command.

4. The antenna system of claim 1 further comprising line protection units coupled between the motor and the controller.

5. The antenna system of claim 1 wherein the first antenna is configured for broadband wireless communication.

6. The antenna system of claim 1 wherein:
   the first communication interface is configured to receive another antenna system command from the communication network and to transfer an antenna system response to the communication network; and
   the controller is configured to process the other antenna system command to generate the antenna system response.

7. The antenna system of claim 6 wherein the antenna system command indicates a request for the first position of the first antenna, and the antenna system response indicates the first position of the first antenna.

8. The antenna system of claim 1 further comprising a second communication interface configured to transfer the antenna system command to the communication network for delivery to the first communication interface.

9. The antenna system of claim 8 wherein the antenna system is configured to detect an antenna system condition, and in response to the antenna system condition, to generate the antenna system command transferred by the second communication interface.

10. A method of operating an antenna system comprising:
    receiving an antenna system command from a communication network;
    processing the antenna system command to generate a motor control signal; and
    processing the motor control signal to move a first antenna from a first position to a second position, wherein the second position allows the first antenna to operate as a back-up to a second antenna.

11. The method of claim 10 wherein the second position allows the first antenna to compensate for signal loss.

12. The method of claim 10 further comprising successfully collecting a password before moving the first antenna in response to the antenna system command.

13. The method of claim 10 further comprising providing line protection for the motor control signal.

14. The method of claim 10 wherein the first antenna is configured for broadband wireless communication.

15. The method of claim 10 further comprising:
receiving another antenna system command from the communication network;
processing the other antenna system command to generate an antenna system response; and
transferring the antenna system response to the communication network.

16. The method of claim 15 wherein the antenna system command indicates a request for the first position of the first antenna, and the antenna system response indicates the first position of the first antenna.

17. The method of claim 10 further comprising transferring the antenna system command to the communication network.

18. The method of claim 17 further comprising detecting an antenna system condition, and in response to the antenna system condition, generating the antenna system command.

* * * * *